Feb. 15, 1927.
A. M. JOHNSON
1,617,910
DRILLING MACHINE AND THE LIKE
Filed March 1, 1924
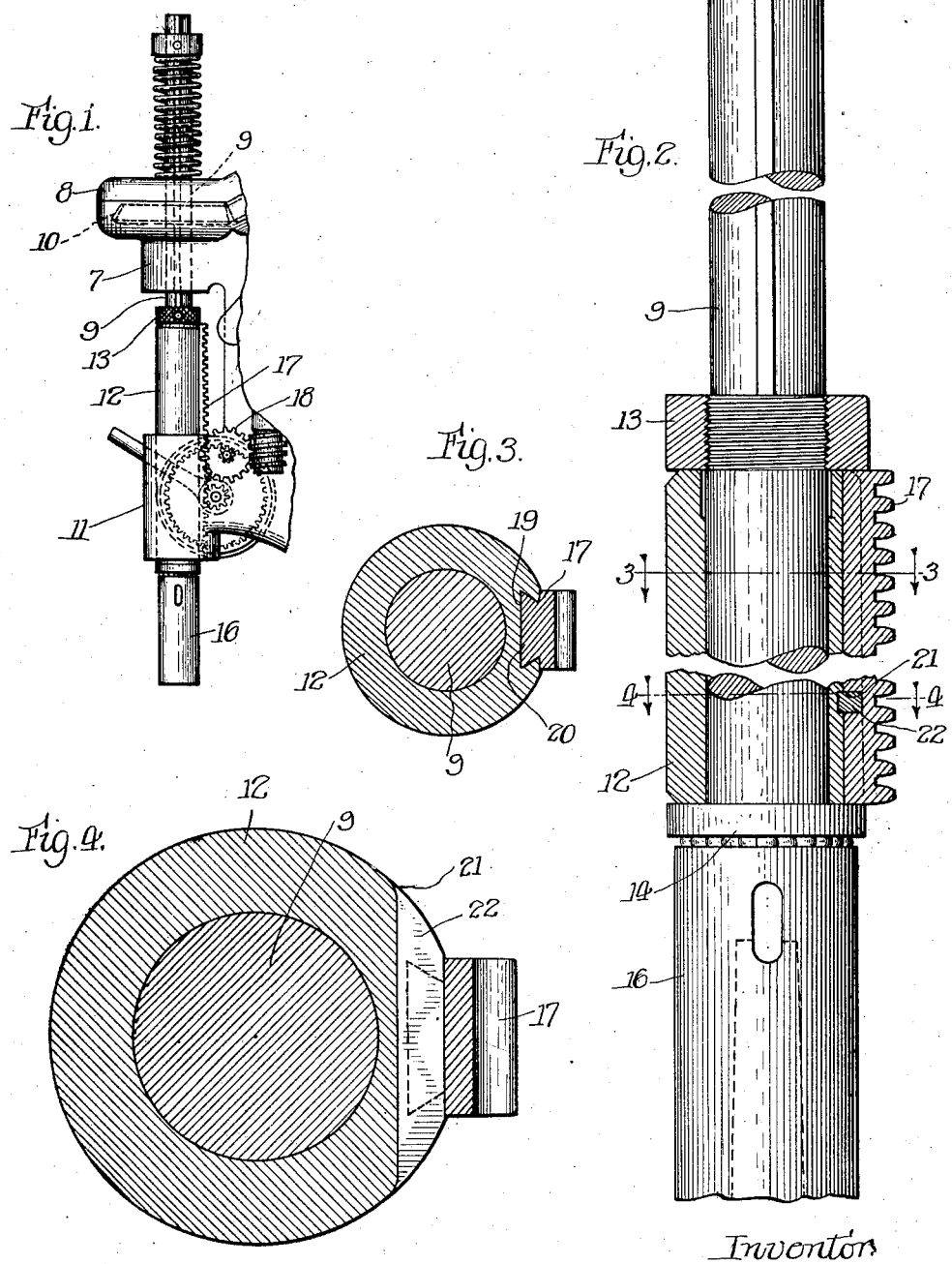
Inventor
Albert M. Johnson,
By Chindahl, Parker & Carlson
Attys.

Patented Feb. 15, 1927.

1,617,910

UNITED STATES PATENT OFFICE.

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS.

DRILLING MACHINE AND THE LIKE.

Application filed March 1, 1924. Serial No. 696,164.

The invention relates to machine tools of the type adapted for drilling, tapping and the like, and concerns more especially the means for effecting the longitudinal or feeding movement of the tool spindle.

The means usually employed for reciprocating the tool spindle comprises a sleeve which is held against endwise movement on the spindle but in which the spindle is free to rotate. This sleeve carries a toothed rack with which a pinion of the feed mechanism is adapted to mesh. It will be apparent that these racks are subjected to heavy downward pressure, and that the means for connecting the rack to the sleeve must, therefore, be capable of withstanding considerable strain.

A method commonly employed for fastening the rack onto the sleeve involves the use of screws entered between the teeth and engaging in the sleeve; but difficulty is frequently experienced with this type of fastening means in that the fastening screws sometimes work loose, resulting in an injury to the driving pinion and, of course, a sufficient loosening of the screws results in the displacement of the rack.

The object of my invention is to provide an improved fastening means between the spindle sleeve and rack which will insure that the rack when once secured to the sleeve cannot work loose.

In the accompanying drawings Figure 1 is a fragmentary side elevation of a drilling or tapping machine having a reciprocatory tool spindle and a feeding sleeve equipped with a rack whereby the sleeve may be actuated to move the spindle into engagement with the work. Fig. 2 is a fragmentary sectional view illustrating my improved method of fastening the feeding rack to the sleeve. Fig. 3 is a transverse sectional view taken in the plane of line 3—3 of Fig. 2. Fig. 4 is a similar view taken on an enlarged scale, substantially in the plane of line 4—4 of Fig. 2.

I have shown for purposes of illustration a portion of a drilling or tapping machine having an upper bearing 7 and an associated gear housing 8 through which a tool spindle 9 is arranged to slide. The spindle is arranged to be driven by a beveled gearing 10 having a splined connection with the spindle to permit of its reciprocation toward and from the work, and connected with a suitable source of power. The machine also comprises a cylindrical bearing head 11 in which is mounted for an up and down sliding movement a sleeve 12. The spindle 9 is journaled in said sleeve but is held against endwise movement therein by any suitable means, such as a nut 13, the lower end of the sleeve being arranged to engage with a bearing member 14.

The lower end of the spindle is shown as provided with a tapered socket 16 of usual construction. The sleeve has secured upon its rear side a gear rack 17 with which meshes a pinion 18 of the feed mechanism.

The means which I have provided for fastening the gear rack 17 to the sleeve comprises an undercut or dovetail groove 19 formed in one side of the sleeve 12 longitudinally thereof, and a dovetail tenon 20 adapted to be slid endwise in the groove. The tenon 20 is formed rigid with and preferably integral with the rack bar 17, the face of the sleeve at the edges of the groove 19, preferably made somewhat flat to provide a seat for the bar 17. Transversely of the groove 19 and of the interfitting member 20 I provide complementary grooves arranged to co-act to form a keyway 21, in which is inserted a key 22. When the key has been inserted it is permanently secured against endwise movement in any suitable way, as by heading over the opposite ends thereof as indicated at 22 Fig. 4.

It will be observed that the key 22, by holding the rack in the groove 19, not only effectively secures the rack against longitudinal movement relative to the sleeve but also, because of the shape of the groove 19 and the co-acting tenon 20 of the rack, effectually holds the rack against radial movement. The construction is at the same time very rugged in character, and exceedingly simple and cheap to manufacture.

I claim as my invention:

The combination with a spindle for drilling machines, of a feeding sleeve in which the drill spindle is journaled, said sleeve having formed in its periphery a longitudinal dovetail groove and a second groove extending transversely of said dovetail groove, a rack bar having a tenon formed integral therewith on the side opposite its teeth and fitting said dovetail groove to provide a connection between said rack bar and said sleeve, said tenon being formed with a groove cooperating with the transverse groove in said sleeve to form a transverse keyway through said dovetailed connection, and a key fitted into said keyway and serving to lock said rack bar and sleeve against relative movement.

In testimony whereof, I have hereunto affixed my signature.

ALBERT M. JOHNSON.